(12) United States Patent
Verosky et al.

(10) Patent No.: US 8,801,890 B2
(45) Date of Patent: Aug. 12, 2014

(54) CURABLE SILICONE COMPOSITIONS CONTAINING REACTIVE NON-SILOXANE-CONTAINING RESINS

(75) Inventors: Christopher Verosky, Coventry, CT (US); Michael Levandoski, Bristol, CT (US); Richard Corrao, Manchester, CT (US); Chiu-Sing Lin, Rocky Hill, CT (US); Baharam Issari, Rocky Hill, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/352,609

(22) Filed: Jan. 18, 2012

(65) Prior Publication Data

US 2012/0111498 A1     May 10, 2012

Related U.S. Application Data

(63) Continuation of application No. PCT/US2010/042538, filed on Jul. 20, 2010.

(60) Provisional application No. 61/227,322, filed on Jul. 21, 2009.

(51) Int. Cl.
| | |
|---|---|
| *C08L 83/06* | (2006.01) |
| *B05D 3/10* | (2006.01) |
| *B32B 37/12* | (2006.01) |
| *C08L 83/04* | (2006.01) |
| *C09J 183/04* | (2006.01) |
| *C08G 77/18* | (2006.01) |
| *C08G 77/12* | (2006.01) |
| *C08L 75/04* | (2006.01) |
| *C08G 77/16* | (2006.01) |

(52) U.S. Cl.
CPC .............. *C08L 83/04* (2013.01); *C08G 77/18* (2013.01); *C08G 77/12* (2013.01); *C09J 183/04* (2013.01); *C08L 75/04* (2013.01); *C08G 77/16* (2013.01)
USPC ............................ 156/329; 427/387; 524/506

(58) Field of Classification Search
None
See application file for complete search history.

(56) References Cited

U.S. PATENT DOCUMENTS

| | | | | |
|---|---|---|---|---|
| 4,618,646 | A | * | 10/1986 | Takago et al. .................. 524/783 |
| 5,063,270 | A | * | 11/1991 | Yukimoto et al. ............. 524/306 |
| 5,338,574 | A | * | 8/1994 | O'Neil et al. .................. 427/387 |
| 5,459,206 | A | | 10/1995 | Somemiya et al. |
| 6,218,461 | B1 | | 4/2001 | Schwabe et al. |
| 6,593,413 | B2 | * | 7/2003 | Muramatsu et al. .......... 524/493 |
| 6,906,161 | B2 | * | 6/2005 | Sakamoto et al. ............. 528/35 |
| 7,605,203 | B2 | * | 10/2009 | Feng et al. ..................... 524/268 |
| 2002/0010251 | A1 | | 1/2002 | Muramatsu et al. |
| 2006/0189736 | A1 | | 8/2006 | Mori et al. |
| 2006/0258818 | A1 | * | 11/2006 | Kimura et al. ................. 525/477 |
| 2006/0270770 | A1 | * | 11/2006 | Feng et al. ..................... 524/268 |
| 2008/0312369 | A1 | * | 12/2008 | Beers et al. .................... 524/425 |
| 2010/0069531 | A1 | * | 3/2010 | Sakamoto et al. ............. 523/177 |

FOREIGN PATENT DOCUMENTS

| | | |
|---|---|---|
| JP | 11349814 | 12/1999 |
| JP | 2000302978 | 10/2000 |
| JP | 2007119768 | 5/2007 |
| JP | 2008150491 | 7/2008 |
| JP | 2009517534 | 4/2009 |

OTHER PUBLICATIONS

CAB-O-SIL TS-720 technical data shieet from Cabot, 2 pages, 2002.*
International Search Report issued in connection with International Patent Application No. PCT/US2010/042538 mailed on Mar. 18, 2011.

* cited by examiner

*Primary Examiner* — Robert S Loewe
(74) *Attorney, Agent, or Firm* — James E. Piotrowski; Steven C. Bauman

(57) ABSTRACT

The present invention relates to two-part moisture curing compositions useful for adhesive, sealing, potting and other applications. In particular, the present invention relates to two-part room temperature vulcanizing (RTV) compositions which include in one of the parts a moisture curing organic polymer which is substantially free or does not contain siloxane bonds in its backbone.

22 Claims, No Drawings

CURABLE SILICONE COMPOSITIONS CONTAINING REACTIVE NON-SILOXANE-CONTAINING RESINS

FIELD OF THE INVENTION

The present invention relates to two-part moisture curing compositions useful for adhesive, sealing, potting and other applications. In particular, the present invention relates to two-part room temperature vulcanizing (RTV) compositions which include in one of the parts a moisture curing organic polymer which is substantially free of or does not contain any siloxane (SiOSi) bonds in its backbone.

BRIEF DESCRIPTION OF RELATED TECHNOLOGY

Two-part RTV compositions are known. Generally these compositions have used moisture-curing polydiorganosiloxane polymers in at least one of the two parts to serve as the primary vulcanizable portion. Additionally, such known RTV moisture curing compositions typically contain a moisture cure catalyst, such as tin or similar metal or metal oxide catalysts. During shelf life, siloxane polymers are known to undergo a reversion process in the presence of residual moisture and catalyst, which results in cleavage of the siloxane bond and a concomitant drop in viscosity of the curable composition. This process may self-perpetuate as additional silanols and alcohol are generated by the cleavage reaction. This process further results in an inability to achieve a cured polymer with desired properties, as well as a significant drop-off in viscosity and cure speed of the two part formulation due to consumption of the crosslinking silane.

It would be beneficial to obtain a two-part RTV composition which did not suffer from such undesired reactions and degradation of the polymeric backbone.

SUMMARY OF THE INVENTION

In one aspect of the invention, there is provided a two-part moisture curing composition which includes a first part including at least one hydroxyl-terminated polydiorganosiloxane and water; and a second part including at least one moisture curing silyl-functionalized hydrocarbon, at least one alkoxy crosslinker and at least one moisture cure catalyst.

In another aspect of the invention, there is provided a method of preparing a moisture curable two-part composition which includes providing a first part by mixing: (a) a first part which includes at least one hydroxyl-terminated polydiorganosiloxane and water; and providing a second part by mixing: (b) a second part which includes at least one moisture curing silyl-functionalized hydrocarbon, at least one alkoxy crosslinker and at least one moisture cure catalyst.

In yet another aspect of the invention, there is provided a polymeric reaction product formed by the process which includes mixing together a first part including a hydroxyl-terminated polydiorganosiloxane and water, with a second part which includes at least one moisture-curing silyl-functionalized hydrocarbon, at least one alkoxy crosslinker and at least one moisture cure catalyst; and permitting the mixture to moisture cure.

In yet another aspect of the invention, there is included a method of adhesively joining parts which includes applying the composition as described herein to at least one of two parts to be joined, mating the parts together such that composition is therebetween, and allowing the composition to cure.

In still another aspect of the invention, there is provided a method of sealing which includes applying the composition as described herein to a part to be sealed and permitting it to cure.

DETAILED DESCRIPTION

For purposes of this invention, the term(meth)acrylate will include methacrylates and acrylates.

The moisture curing, two part compositions of the present invention may be used for a wide variety of end-use applications, including potting for electronic parts, such as solar panels and stove tops, sealing applications such as in the electronics and automotive industries, and adhesive bonding.

The two-part, moisture curing RTV composition of the present invention include in a first part hydroxyl-terminated polydiorganosiloxanes and water.

Useful polydiorganosiloxanes may be selected from a wide variety of polymers with various molecular weights and viscosities designed to fit various applications. The hydroxyl-terminated polydiorganosiloxanes have backbone repeating units of the formula:

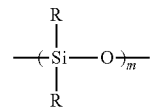

Where R is an organo group and m is an integer 100 to 10,000. R may be chosen from $C_{1-20}$ alklyl and desirably $C_{1-4}$ alkyl, such as methyl, ethyl, propyl or butyl. More desirably, the hydroxyl-terminated polydiorganosiloxane is hydroxyl-terminated polydimethylsiloxane. The R group may or may not be the same on each silicon atom. The hydroxyl-terminated polydiorganosiloxane may be present in amounts of about 20% to about 90% by weight of the first part of the two part composition.

The water source for the first part of the two part composition may be directly added as "free" water, or carried on a separate component, such as a filler material. Desirably, such a water source is in the form of a wet filler, such as precipitated calcium carbonate, sodium carbonate, potassium carbonate and combinations thereof. Various silicates, aluminas, oxides, carbon black and silicas, and combinations of these material may also be employed dry or wet. The wetted filler provides a water source for the condensation reaction which occurs when the first part is combined with the second part, but also may provide structural body and strength to the overall cured composition. The wetter filler may be present in the first part in amounts of about 5% to about 70% by weight of the first part of the composition. Combinations of fillers, dry or wet, may be employed.

The second part of the inventive compositions includes a moisture curing silyl-functionalized hydrocarbon. These moisture curing reactive materials are desirably free of siloxane bonds in the backbone which are susceptible to cleavage and reversion reactions prior to use, e.g., during storage with a catalyst. The backbone may be chosen from a wide variety of polymeric types, with various units linked together to achieve various end-use properties. Copolymers may also be used as the backbone, including random and block copolymers.

Non-limiting examples of such reactive resins which are free of siloxane bonds include those conforming to the formula:

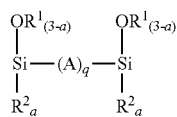

where $R^1$ is alkyl $C_{1-4}$, aryl, acyl, alkoxyalkyl; a is an integer 0-2; A is a hydrocarbon diradical; q is from 2 to 1,000; and $R^2$ is $C_{1-20}$ hydrocarbon radical. Desirably, $R^1$ is methyl, ethyl or propyl. $R^1$ in each instance may be the same or different and may be substituted or unsubstituted. $R^2$ in each instance may be the same or different and may be substituted or unsubstituted. Backbone A may include organic segments interrupted by one or more atoms selected from N, O, S and Si.

The moisture curing organic polymers are designed to be substantially, if not entirely, free of siloxane units in the backbone, in order to overcome the potential for reversion reactions during storage, which are common to polymers containing such backbone units. Thus, the reactive polymers useful in the present invention provide a means for eliminating the problems attendant with commonly used two part compositions which have polyorganosiloxanes as the reactive resin.

Substituent $R^1$, in combination with the oxygen to which it is attached, forms a hydrolyzable group, which provides the compositions of the present invention with their ability to undergo room temperature vulcanization (RTV). RTV cure typically occurs through exposure of the compositions of the present invention to moisture. The presence of hydrolyzable moisture curing groups, such as alkoxy groups, on the silicon atom permits the compositions of the present invention to crosslink. Suitable hydrolyzable groups include alkoxy groups such as methoxy, ethoxy, propoxy, and butoxy; aryl groups such as phenoxy; acyloxy groups such as acetoxy; aryloxy groups such as phenoxy; and alkoxyalkyl groups such as $CH_3OCH_2CH_2$—. Larger groups such as propoxy and butoxy are slower to react than smaller groups such as methoxy and ethoxy. Accordingly, the rate at which the compositions of the invention undergo moisture cure can be influenced by choosing appropriately sized groups for substituent $R^1$.

As used herein, the term "hydrocarbon radical" is intended to refer to radicals which are primarily composed of carbon and hydrogen atoms. Thus, the term encompasses aliphatic groups such as alkyl, alkenyl, and alkynyl groups; aromatic groups such as phenyl; and alicyclic groups, such as cycloalkyl and cycloalkenyl. The term "hydrocarbon diradical" is intended to refer to the corresponding divalent radicals of these groups.

As discussed above, the backbone A of the moisture curing silyl-terminated functionalized hydrocarbon maybe chosen from a wide variety of polymers and structural units. For example, in some instances A may be a polyacrylate backbone, a polyurethane backbone, a polyether backbone, a polyethylene or polypropylene backbone, a polypropylene oxide backbone, an epoxy backbone or a combination of these polymer units. In each case, the terminal ends are silylated and contain moisture curing groups as defined above. Desirably $C_{1-4}$ are the moisture curing groups.

In a particularly desirable aspect, backbone A is a polyacrylate such as those sold by Kaneka® Corporation under the tradename KANEKA Telechelic Polyacrylates. For example, Kaneka® silyl-group terminated polyacrylates such as grades SA100S, SA110S, SA120S, OR100S, OR110S, OR120S, SA200SX and OR300S may be used.

Additional SPUR polymers marketed by GE/Momentive and STP polymers marketed by Wacker Chemie, may also be used.

For example, the backbone of the polyacrylate may be multifunctional, thereby imparting a higher degree of functionality to the polymer than alkyl(meth)acrylate polymers, which may also be included in A and are described below. The monomer used to form the backbone of the polyacrylate polymer is not particularly restricted, but a variety of monomers may be selectively employed. Suitable examples include, but are not limited to, (meth)acrylic monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl (meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl(meth)acrylate, γ-(methacryloyloxypropyl)trimethoxysilane, (meth)acrylic acid-ethylene oxide adduct, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl (meth)acrylate, 2-perfluoromethyl-2-perfluoroethylmethyl (meth)acrylate, 2-perfluorohexylethyl(meth)acrylate, 2-perfluorodecylethyl(meth)acrylate, 2-perfluorohexadecylethyl (meth)acrylate, and the like. These monomers may be used each alone or a plurality of them may be copolymerized.

The polyacrylate may have a molecular weight distribution, i.e. the ratio of weight average molecular weight to number average molecular weight as determined by gel permeation chromatography, of less than 1.8, desirably not more than 1.7, more desirably not more than 1.6, still more desirably not more than 1.5 or not more than 1.4, and most desirably not more than 1.3.

The functionalization of the silyl-functionalized polyacrylate backbone may be in the form of a pendant group or a terminal or end-capped group. Desirably the terminal groups on the backbone are moisture curing groups, but the backbone per se may also be functionalized with moisture curing, free radical curing or other reactive functionalized groups. In some embodiments of the present invention, the polyacrylate may be an alkyl acrylate polymer, such as an alkyl(meth)acrylate polymer. More specifically, the backbone of the silyl end-capped alkyl(meth)acrylate polymer may include a homopolymer of $C_1$-$C_{10}$ (meth)acrylates or a copolymer of $C_1$-$C_{10}$ (meth)acrylates. Suitable alkyl acrylates include, but are not limited to, ethyl acrylate, butyl acrylate and 2-ethylhexyl acrylate. Copolymeric acrylate backbones may contain copolymerized units of up to 40 weight percent monovinyl monomers, for example, styrene, acrylonitrile, vinylbutyl ether, acrylic acid and $C_1$-$C_{10}$ alkyl acrylates different from the principal alkyl acrylate comonomer. Such copolymers are available commercially, for example, as Hytemps® acrylate rubbers (acrylic homopolymer and copolymer rubbers available from Nippon Zeon, KK) and Toacron® AR-601 acrylate rubbers (polyethylacrylate polymers, available from Toa Paint, KK).

The moisture curing silyl-functionalized hydrocarbon resins may be present in any useful amount, but desirably in amounts of about 30% to about 90% by weight of the part, and more desirably about 50% to about 80% by weight of the total composition as a whole (both parts included).

The inventive compositions may include moisture curing catalysts to further enhance or control the cure speed. Suitable moisture-cure catalysts include, without limitation, metal compounds which contain such metals as titanium, tin, or zirconium. Illustrative examples of titanium compounds include tetraisopropoxy titanate and tetrabutoxy titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. Other condensation catalysts are contemplated. The moisture-cure catalysts may be employed in an amount sufficient to promote moisture-cure, which generally is from about 0.05% to about 5.00% by weight in the overall mixed formulation, and advantageously from about 0.1% to about 1.0% by weight in the overall mixed formulation, i.e., by weight of the total two-part composition.

The inventive compositions may also contain one or more amino-containing silane compounds which act as adhesion promoters. These amino-containing silane compounds may be present in amounts of about 0.05% to about 5.0% by weight in the overall mixed formulation, i.e., by weight of the total two-part composition. Desirably, these compounds are present in amounts of about 0.3% to about 1.5% by weight in the overall mixed formulation, i.e., by weight of the total two-part composition. Amino-containing silane compounds which are useful in the present invention include, but are not limited to, silane compounds containing amino-alkyl groups, such as gamma-ureidopropyltrimethoxy silane, 3-aminopropyl trimethoxysilane, N,N'-bis(3-trimethoxy silylpropyl) urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, tertiary alkyl carbamate silane, and aminoethyl-3-aminopropyl-methyl-dimethylsilane. Other desirable amino-containing silane compounds include silane compounds containing amino-cycloaliphatic groups such as methyl tris(cyclohexylamino) silane and silane compounds containing amino-aromatic groups such as methyl tris-(N-methylbenzamido)silane. Adhesion promoters may be present in amounts of up to about 5%, and desirably up to about 2% by weight in the overall mixed formulation, i.e., by weight of the total two-part composition.

Examples of useful commercially available adhesion promoters include octyl trimethoxysilane (commercially available from Witco Corporation, Greenwich, Conn. under the trade designation A-137), glycidyl trimethoxysilane (commercially available from Witco under the trade designation A-187), methacryloxypropyl trimethoxysilane (commercially available from Witco under the trade designation of A-174), vinyl trimethoxysilane, tetraethoxysilane and its partial condensation products, and combinations thereof.

The organosilane components may be present in any useful amount. Desirably they are present in amounts of about 1% to about 10% by weight in the overall mixed formulation, i.e., by weight of the total two-part composition.

The inventive compositions may also contain other additives so long as they do not deleteriously inhibit the curing mechanism, properties, or intended use. For example, conventional additives such as fillers, antioxidants, other adhesion promoters, pigments, moisture scavengers, inhibitors, odor masks, and the like may be included.

EXAMPLES

The following examples illustrate various aspects of the invention. Percentages are based on weight of Parts A and B respectively, unless otherwise stated. Part A and Part B are mixed at the specified ratios by volume.

Table I below provides inventive compositions A-F. These compositions were formulated to be used in a volume mix ratio of 10:1 (Part A:Part B).

TABLE 1

INVENTIVE COMPOSITIONS

| COMPONENT | WEIGHT % COMPOSITION | | | | | |
|---|---|---|---|---|---|---|
| | A | B | C | D | E | F |
| Volume Mix Ratio, Part A to Part B | 10:1 | 10:1 | 10:1 | 10:1 | 10:1 | 10:1 |
| Part A | | | | | | |
| Hydroxyl terminated polydiorganosiloxane[1] | 70 | 55 | 76.5 | 69.5 | 55 | 76.5 |
| Precipitated (wet) Calcium Carbonate[2] | 30 | 18 | — | — | 18 | — |
| Precipitated Silica | — | — | 8 | — | — | 8 |
| Black Iron Oxide | — | — | 15.5 | — | — | 15.5 |
| Dry Fillers | — | 27 | — | 30 | 27 | — |
| Water (free) | — | — | — | 0.5 | — | — |
| Part B | | | | | | |
| Silylated (Alkoxy) Organic Polymer[3] | 70 | 70 | 70 | 70 | 60.3 | 75 |
| Dry Fillers | 0.45 | 0.45 | 0.45 | 0.45 | 2.0 | — |
| Moisture Scavenger | 0.5 | 0.5 | 0.5 | 0.5 | 1.0 | 0.7 |
| Vinyl/methyltrialkoxysilane | 18.6 | 18.6 | 18.6 | 18.6 | 25 | 15 |
| Secondary crosslinking silane | 6.25 | 6.25 | 6.25 | 6.25 | 8 | — |
| Cure Catalyst[4] | 1.2 | 1.2 | 1.2 | 1.2 | 1.2 | 1.8 |
| Functional trialkoxysilane | 3.0 | 3.0 | 3.0 | 3.0 | 2.5 | 7.5 |

[1]Polydimethylsiloxane (12,000-28,000 m.w.)
[2]0.3-1.0% water for the three fillers, calcium carbonate, precipitated silica and black iron oxide
[3]Kaneka Telechelic Polyacrylates
[4]Alkyl tin carboxylate Each of inventive compositions were prepared by first combining the components to make the individual Parts A and B. Then Parts A and B were mixed in a volume ratio of 10:1 (A:B), applied to substrates and allowed to moisture cure. The cured polymers in each case demonstrated excellent cure characteristics. Additionally, when the compositions are stored as separate parts in storage containers or cartridges for 6 months, Part B which contains the silylated moisture curing resin, remained stable with no change in viscosity or loss in cure speed versus the same formulation using methyl terminated PDMS, as shown in Table 2 below.

TABLE 2

| | Original Value | Aged 3 Months RT | Aged 6 Months RT |
|---|---|---|---|
| Composition A | | | |
| Skin Over Time, min. | 25 | 28 | 27 |
| Viscosity, mPas | 4,700 | 4,950 | 4,870 |
| Composition P* | | | |
| Skin Over Time, min. | 25 | >3 days < 7 days | Not Cure > 7 days |
| Viscosity, mPas | 5,200 | 2,740 | 2,120 |

*Composition P was the identical formulation with the polyacrylate resin being replaced by methyl terminated polydimethoxysiloxane to show change in viscosity and cure speed over room temperature storage.

As seen in Table 2 above, Inventive Composition A was compared with Composition P (prior art), which was identical in formulation, except the moisture-curing silyl-functionalized hydrocarbon (polyacrylate backboned polymer with siloxy terminal groups) was replaced with a siloxane backboned polymer (methyl-terminated polydimethylsiloxane). As noted from Table 2, over the room temperature aging period (3 and 6 months), the viscosity of the prior art comparative example dropped significantly, i.e., a greater than 50% drop and which results in a decrease in molecular weight of the polymer chains. This drop is due to the undesirable cleavage reactions which are typical in such formulations. The drop in viscosity directly affects the cure ability, as well as the resultant cure properties of the final cured product, as is appreciated by those skilled in the art.

Additionally, the skin over time increased from 25 minutes to between 3-7 days, further indicating a substantial decrease in the ability of the composition to moisture cure at room temperature.

These results are in direct contrast to composition A, which had no decrease in viscosity over the 3 and 6 month room temperature aging tests, and which demonstrated no significant loss in ability to cure as evidenced by a skin over time which increased only from the original 25 minutes to 27 and 28 minutes over the six month period.

Table 3 below, shows inventive compositions G-K. Compositions G-I were formulated to be used in a volume mix ratio of 4:1 (A:B), compositions J-K were formulated to be used in a volume mix ratio of 2:1 (A:B) and composition L was formulated to be used in a volume mix ration of 1:1 (A:B) to show the invention is not restrictive of mix ratio.

TABLE 3

INVENTIVE COMPOSITIONS

| COMPONENT | WEIGHT % COMPOSITION | | | | | |
|---|---|---|---|---|---|---|
| | G | H | I | J | K | L |
| Volume Mix Ratio, Part A to Part B | 4:1 | 4:1 | 4:1 | 2:1 | 2:1 | 1:1 |
| Part A | | | | | | |
| Hydroxyl terminated polydiorganosiloxane[5] | 55 | 55 | 76.5 | 55 | 70 | 70 |
| Precipitated (wet) Calcium Carbonate[6] | 18 | 18 | — | 18 | 30 | 30 |
| Precipitated Silica | — | — | 8 | — | — | — |
| Black Iron Oxide | — | — | 15.5 | — | — | — |
| Dry Fillers | 27 | 27 | — | 27 | — | — |
| Water (free) | — | — | — | — | — | — |
| Part B | | | | | | |
| Silylated (Alkoxy) Organic Polymer[7] | 77.2 | 69.5 | 78.2 | 83.7 | 61.5 | 50 |
| Dry Fillers | 1 | 10 | — | 5 | 30 | 45.6 |
| Moisture Scavenger | 0.5 | 0.75 | 0.5 | 0.5 | 0.5 | 0.3 |
| Vinyl/methyltrialkoxysilane | 16 | 12.5 | 16 | 7.5 | 4.5 | 2.1 |
| Secondary crosslinking silane | — | 3.75 | — | — | 1.5 | 0.9 |
| Cure Catalyst[8] | 0.55 | 0.5 | 0.55 | 0.3 | 0.5 | 0.2 |
| Functional trialkoxysilane | 4.75 | 3 | 4.75 | 3 | 1.5 | 0.9 |

[5]Polydimethylorganosiloxane (12,000-28,000 m.w.)
[6]0.3-1.0% water for the three fillers, calcium carbonate, precipitated silica and black iron oxide
[7]Kaneka Telechelic Polyacrylates
[8]Alkyl tin carboxylate Each of Parts A and B were formulated as in Tables 1-3 by mixing. The parts were then combined, mixed in the volume ratios recited and applied to parts. In all cases, a uniform solid elastomeric material was achieved in less than 24 hours cure, which was suitable for numerous applications for which the product was designed.

In each composition, Part B remained stable during storage for 6 months at room temperature without loss of cure speed or viscosity.

The invention claimed is:

1. A two-part moisture-curable composition comprising:
   (a) a first part comprising at least one hydroxyl-terminated polydiorganosiloxane and a water source;
   (b) a second part comprising at least one moisture cure catalyst, and at least one moisture curing silyl-functionalized material having the formula:

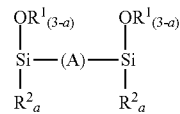

where $R^1$ is $C_{1-4}$ alkyl, aryl, acyl, alkoxyalkyl; a is an integer 0-2; A is a polymer backbone comprising acrylate moieties; A is not interrupted by nitrogen atoms, and no nitrogen atoms are present between the terminal silicon atoms and A; and $R^2$ is $C_{1-20}$ hydrocarbon radical.

2. The composition of claim 1, wherein the acrylate moieties are functionalized.

3. The composition of claim 1, wherein the water source comprises a wet-filler material.

4. The composition of claim 1, wherein the second part further comprises a moisture curable organosilane.

5. The composition of claim 1, wherein the second part further comprises a moisture scavenger component.

6. The composition of claim 1, wherein the moisture curing silyl-functionalized material is present in amounts of about 50% to about 80% by weight of the total composition.

7. The composition of claim 1, wherein the hydroxyl terminated polydiorganosiloxane is present in amounts of about 50% to about 80% by weight of the total composition.

8. A cured reaction product formed from the two-part moisture-curable composition of claim 1.

9. The composition of claim 1, wherein the second part further comprises at least one alkoxysilane crosslinker.

10. The composition of claim 1, wherein the second part further comprises a moisture curing silyl-terminated component comprising a polyurethane backbone, a polyether backbone, a polyethylene backbone, a polypropylene backbone, a polypropylene oxide backbone, an epoxy backbone or a combination of these components.

11. The composition of claim 1, wherein the second part further comprises a moisture curing silyl-terminated component comprising a polyurethane backbone, a polyether backbone, or a combination of these components.

12. The composition of claim 1, wherein the second part further comprises a moisture curing silyl-terminated component comprising a backbone including organic segments interrupted by one or more atoms independently selected from N and O.

13. The composition of claim 1, wherein the polymer backbone comprises a copolymer of different acrylate moieties.

14. The composition of claim 1 wherein the polymer backbone of A includes O atoms.

15. The composition of claim 1, wherein the silyl functional groups are terminal.

16. The composition of claim 15 further including a hydrocarbon diradical situated between the silyl end-capped group and the polymer backbone.

17. The composition of claim 16, wherein the hydrocarbon diradical comprises aliphatic groups, aromatic groups, or alicyclic groups.

18. A two-part moisture-curing composition comprising:
   a first part comprising at least one hydroxyl-terminated polydiorganosiloxane and water;

a second part comprising at least one moisture curing silyl-functionalized material comprising acrylate moieties, one or more silyl terminal groups, and a hydrocarbon diradical disposed between the silyl terminal group and the acrylate moiety, at least one alkoxy crosslinker, and at least one moisture cure catalyst.

19. The composition of claim 18 wherein the hydrocarbon diradical is selected from the group consisting of aliphatic groups, aromatic groups, and alicyclic groups.

20. The composition of claim 18 wherein the acrylate moieties comprise a copolymer of different acrylate monomers.

21. The composition of claim 18 wherein the second part further comprises a moisture curing silyl-terminated component comprising a polyurethane backbone, a polyether backbone, a polyethylene backbone, a polypropylene backbone, a polypropylene oxide backbone, an epoxy backbone or a combination of these components.

22. The composition of claim 18 wherein the silyl-functionalized material comprises a backbone including O atoms.

* * * * *